United States Patent
Agarwal et al.

(10) Patent No.: US 8,433,981 B1
(45) Date of Patent: Apr. 30, 2013

(54) CODING ACROSS DATA BLOCKS TO REDUCE WRITE AMPLIFICATION IN NAND FLASH

(75) Inventors: Rajiv Agarwal, Palo Alto, CA (US); Marcus Marrow, Santa Clara, CA (US)

(73) Assignee: SK hynix memory solutions inc., San Jose, CA (US)

( * ) Notice: Subject to any disclaimer, the term of this patent is extended or adjusted under 35 U.S.C. 154(b) by 308 days.

(21) Appl. No.: 12/959,101

(22) Filed: Dec. 2, 2010

Related U.S. Application Data

(60) Provisional application No. 61/335,895, filed on Jan. 12, 2010.

(51) Int. Cl.
*G06F 11/00* (2006.01)
(52) U.S. Cl.
USPC .......................................................... 714/773
(58) Field of Classification Search .................... 714/773
See application file for complete search history.

(56) References Cited

U.S. PATENT DOCUMENTS

| | | | |
|---|---|---|---|
| 2001/0034809 A1* | 10/2001 | Ogawa .......................... | 711/103 |
| 2004/0168017 A1* | 8/2004 | Hayashi ........................ | 711/103 |
| 2011/0032761 A1* | 2/2011 | Sarin et al. ................ | 365/185.03 |
| 2011/0161560 A1* | 6/2011 | Hutchison et al. ............ | 711/103 |

OTHER PUBLICATIONS

Menon et al., An Age-Threshold Algorithm for Garbage Collection in Log-Structured Arrays and File Systems, 1998.
Mendel Rosenblum, The Design and Implementation of a Log-structured File System, 1992.

* cited by examiner

*Primary Examiner* — Bryce Bonzo
(74) *Attorney, Agent, or Firm* — Van Pelt, Yi & James LLP

(57) ABSTRACT

Data is stored from a host. A flash memory is divided into a plurality of memory groups, the memory groups each comprising a plurality of flash memory blocks. A first portion of one of the plurality of memory groups is allocated for storing parity data of an error-correcting code for the memory group. A second portion of the memory group is allocated for storing data from the host. A flash memory block in the memory group is erased prior to writing the data from the host, wherein the flash memory block contains valid data. The erased valid data is recovered using the error-correcting code.

22 Claims, 6 Drawing Sheets

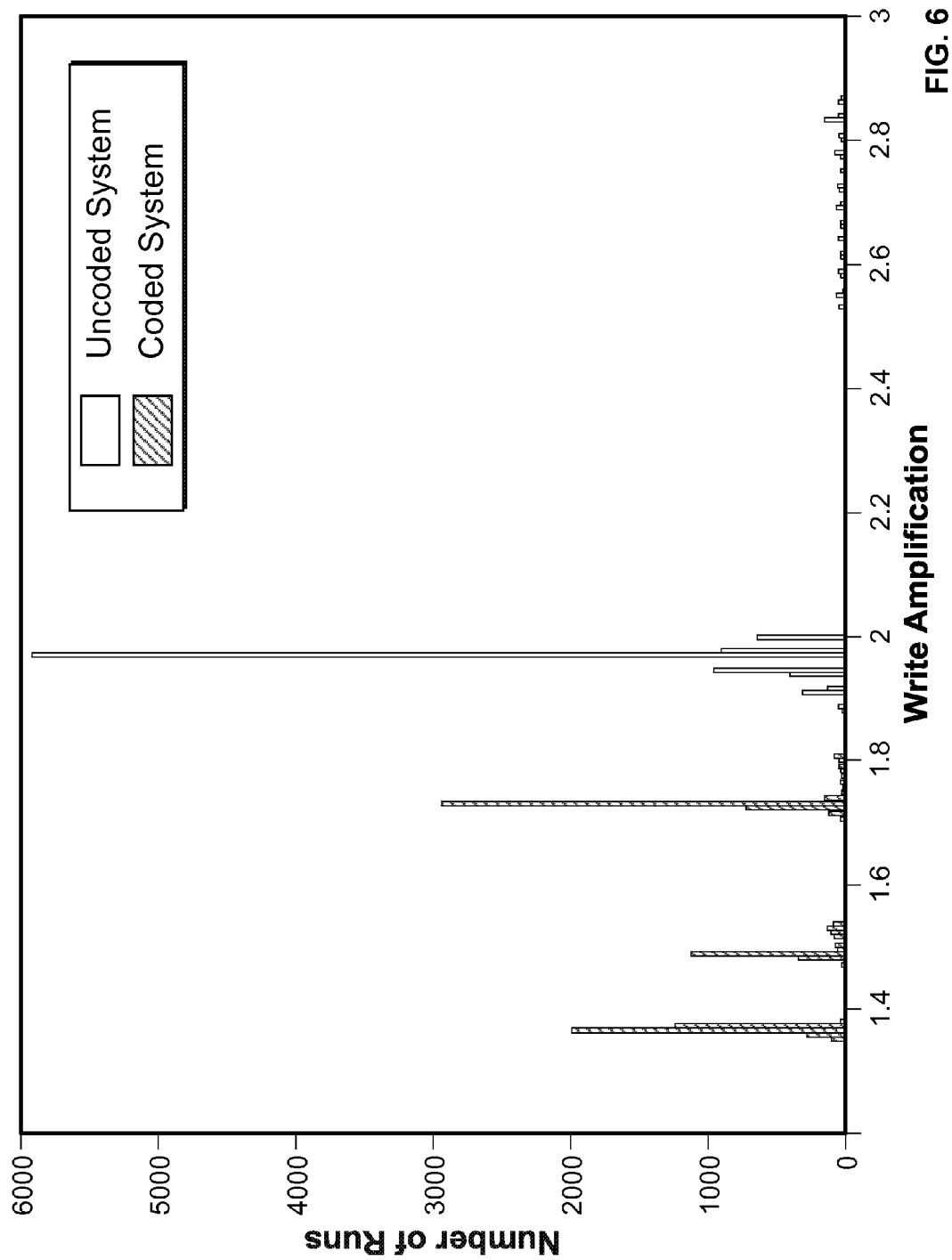

CODING ACROSS DATA BLOCKS TO REDUCE WRITE AMPLIFICATION IN NAND FLASH

CROSS REFERENCE TO OTHER APPLICATIONS

This application claims priority to U.S. Provisional Patent Application No. 61/335,895 entitled CODING ACROSS DATA BLOCKS TO REDUCE WRITE AMPLIFICATION IN NAND FLASH filed Jan. 12, 2010, which is incorporated herein by reference for all purposes.

BACKGROUND OF THE INVENTION

Solid-state drives (SSDs) are data storage devices that use solid-state memory to store data. Most SSDs use NAND-based flash memory. Because flash memory must be erased before it can be rewritten, and the memory can only be erased in larger units called blocks (made up of multiple pages), some of the data already in memory may need to be relocated and then rewritten on the flash memory in order to free up memory space for new data from the host again. This amplifying effect is known as write amplification (WA), and it increases the number of writes required over the life of the SSD. Flash memory can only be programmed and erased a limited number of times before the wear begins to deteriorate the integrity of the storage; i.e., the number of program/erase cycles, or P/E cycles, is finite. Therefore, a lower write amplification is desirable to reduce the number of P/E cycles and thereby increase the life of the SSD.

BRIEF DESCRIPTION OF THE DRAWINGS

Various embodiments of the invention are disclosed in the following detailed description and the accompanying drawings.

FIG. 6 is a histogram comparing the amount of write amplification for an uncoded system using the greedy reclaiming policy and the coded system disclosed herein.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
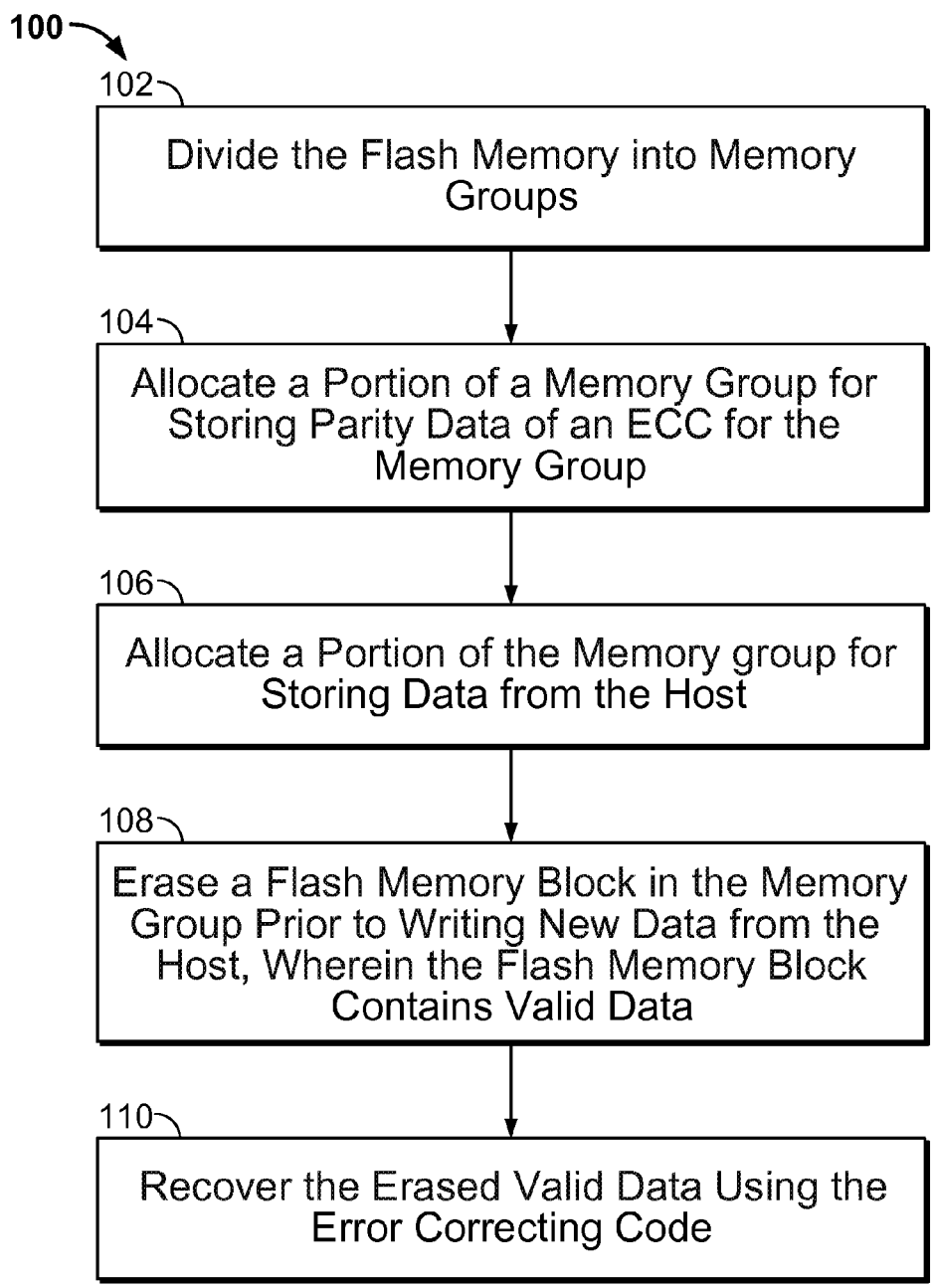
FIG. 1 is a flowchart illustrating an exemplary process for storing data written by a host to a pool of flash memory.

FIG. 1 is a flowchart illustrating an exemplary process for storing data written by a host to a pool of flash memory. Solid-state drives (SSDs) are data storage devices that use solid-state memory for storing data. Most SSDs store data in NAND-based flash memory. Unlike traditional hard-disk drives (HDDs), SSDs contain no moving parts, such as spinning disks and movable read/write heads. As a result, SSDs are quieter and have better shock resistance. SSDs also provide random I/O performance and have faster access time and lower latency and power consumption than HDDs.

All SSDs require a process called garbage collection. When flash memory has been written once, the memory must be erased before it can be overwritten again. Garbage collection refers to the process of erasing memory to free up memory space for new data to be written again.

Flash memory is organized in terms of blocks, with each block having a fixed number of pages. Although flash memory can be read or programmed in units of pages, it can only be erased one block at a time. As a result, during garbage collection, entire blocks of memory are erased to free up memory space for new data to be written again. Typically, each block to be erased contains both valid data and invalid data. The valid data in a block is first read and relocated into temporary buffers. After the block is erased, the valid data is rewritten onto the block again, and the remaining space (some or all of which may have previously stored invalid data) may be used for writing any new data sent from the host.

Because garbage collection requires data to be relocated and rewritten onto the memory, it increases the amount of write amplification in an SSD. Write amplification may be defined as:

$$WA = \frac{\text{data written to the flash memory}}{\text{data written by the host}} \quad (1)$$

The write amplification value for an SSD varies over time. For example, if each of the blocks selected for garbage collection contains 80% valid data and 20% invalid data, then five blocks are erased in order to free up one block of memory for storing new data sent from the host. In particular, the valid data from the original five blocks of memory are first relocated to a temporary buffer, the five blocks are erased, and then the valid data are rewritten back to four blocks of memory, freeing up one block for storing new data sent from the host. Therefore, for one block of new data written by the host, a total of five blocks of data are being written to the flash memory, and the write amplification value for the SSD due to garbage collection is five. Conversely, if each of the blocks selected for garbage collection contains 50% of invalid data, then only two blocks are erased in order to free up one block for storing new data sent from the host, and the write amplification value for the SSD due to garbage collection is two.

As shown in the examples above, write amplification may increase the number of writes required over and above the minimum number of data writes by the host. Because flash memory can only be programmed and erased a limited number of times before the wear begins to deteriorate the integrity of the storage, write amplification reduces the number of program/erase cycles or P/E cycles actually available to the user over the life of an SSD. For example, if WA=5 for an SSD with a 20,000 P/E cycles limit, the user can only write to a memory location 4,000 times. Therefore, a smaller write amplification value is desirable because it increases the life of the SSD.

There are many schemes for selecting the blocks of flash memory for garbage collection. For example, the greedy reclaiming policy attempts to minimize write amplification by selecting blocks with the least amount of valid data. However, the greedy reclaiming policy does not take into consideration wear-leveling, which is a technique for maximizing the life of an SSD. Wear-leveling distributes writes as evenly as possible across all the flash blocks in the SSD, such that the flash blocks all wear out or fail at approximately the same time. The greedy reclaiming policy is effective for reducing write amplification, but because it may wear out some blocks more quickly than others, it may not be the best scheme for the ultimate goal of extending the life of an SSD.

Another way to reduce write amplification is by increasing the level of over-provisioning in an SSD. Over-provisioning (OP) is a technique of reserving a portion of the physical capacity (in gigabytes) of an SSD for handling garbage collection, wear-leveling, and the like. Over-provisioning is the difference between the physical capacity of the flash memory and the user capacity that is made available to the user, divided by the user capacity. For example, if the user capacity were 80% of the physical capacity, then the over-provisioning of the SSD would be 0.2/0.8=25%. A high over-provisioning percentage reduces the amount of data that has to be transferred to and from temporary storage during erasure. For example, if over-provisioning were increased to 90%, then only 10% of a block of flash memory may contain valid data that need to be relocated to a temporary buffer and then rewritten to the flash memory again. In this case, write amplification is very close to one. However, such a high level of over-provisioning will reduce the user capacity significantly. Because of the shortcomings of these and other methods for garbage collection, there is a need for an improved method of reducing write amplification.

The present application discloses techniques for reducing write amplification in an SSD. The flash memory of the SSD is divided into groups of flash memory blocks, with each flash memory block comprising multiple pages. In each of the memory groups, a portion of the flash memory blocks are used for storing data, and a portion of the flash memory blocks are used for storing parity data of an error-correcting code (ECC) that spans across all the flash memory blocks within the memory group. When a new write request from the host arrives, a block of memory (or multiple blocks) is selected from one of the memory groups. The selected block of memory contains both valid data and invalid data. However, unlike other implementations, there is no need to relocate the valid data to a temporary buffer and then rewrite back to the memory immediately. Instead, the selected block of memory (including the valid data) is erased to free up memory space for storing the new data sent from the host. The flash memory blocks of the memory group may be repeatedly erased to free up memory space for storing additional new data sent from the host as long as the total amount of erased valid data in the memory group does not exceed the maximum amount of data correctable by the error-correcting code, i.e., until the recovery capability of the error-correcting code is reached. By keeping track of the amount and location of the valid data within the memory group that have been erased so far, the erased valid data may be recovered by the error-correcting code at a later stage. As will be described in greater detail below, the system and method disclosed in the present application reduces the amount of write amplification in an SSD by improving the distribution of invalid pages over the blocks. The invalid pages become more concentrated in certain blocks, and as a result the amount of write amplification in the SSD is reduced.

Figure 2:
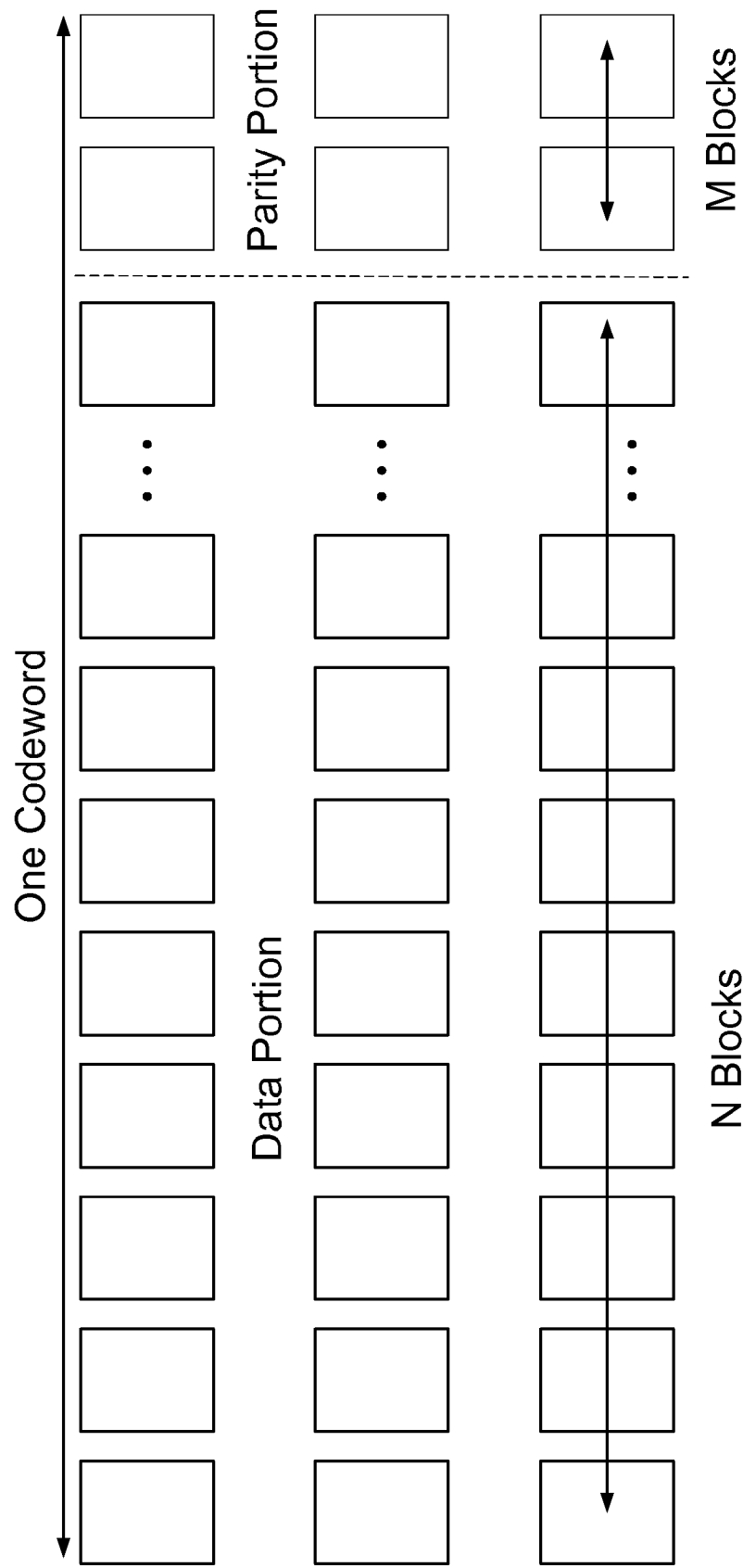
FIG. 2 is a diagram illustrating an exemplary embodiment of a plurality of memory groups, each with a data portion and a parity portion.

Returning to FIG. 1, at 102, the flash memory is divided into a plurality of memory groups. Each memory group may comprise a plurality of blocks of memory, and each block of memory may comprise a plurality of pages. At 104, a portion of a memory group (the parity portion) comprising M blocks is allocated for storing parity data of an error-correcting code for the memory group, and at 106, a portion of the memory group (the data portion) comprising N blocks is allocated for storing data sent from the host. FIG. 2 is a diagram illustrating an exemplary embodiment of a plurality of memory groups, each with a data portion and a parity portion. In this example, each row is a memory group comprising blocks of data in a data portion and blocks of data in a parity portion. In each memory group, the error-correcting code spans across the blocks within the memory group. When a new write request from the host arrives, a block of memory (or multiple blocks) is selected from one of the memory groups. The selected block of memory contains both valid data and invalid data. At 108, the selected block of memory (including the valid data) is erased and rewritten with new data sent from the host. Since erasing the valid data on a memory block is equivalent to creating errors, the selected block of memory may be erased provided that the total amount of erased valid data in the memory group will not exceed the maximum amount of data correctable by the error-correcting code of the memory group. At 110, the erased valid data in the memory group are recovered using the error-correcting code of the memory group.

Figure 3:
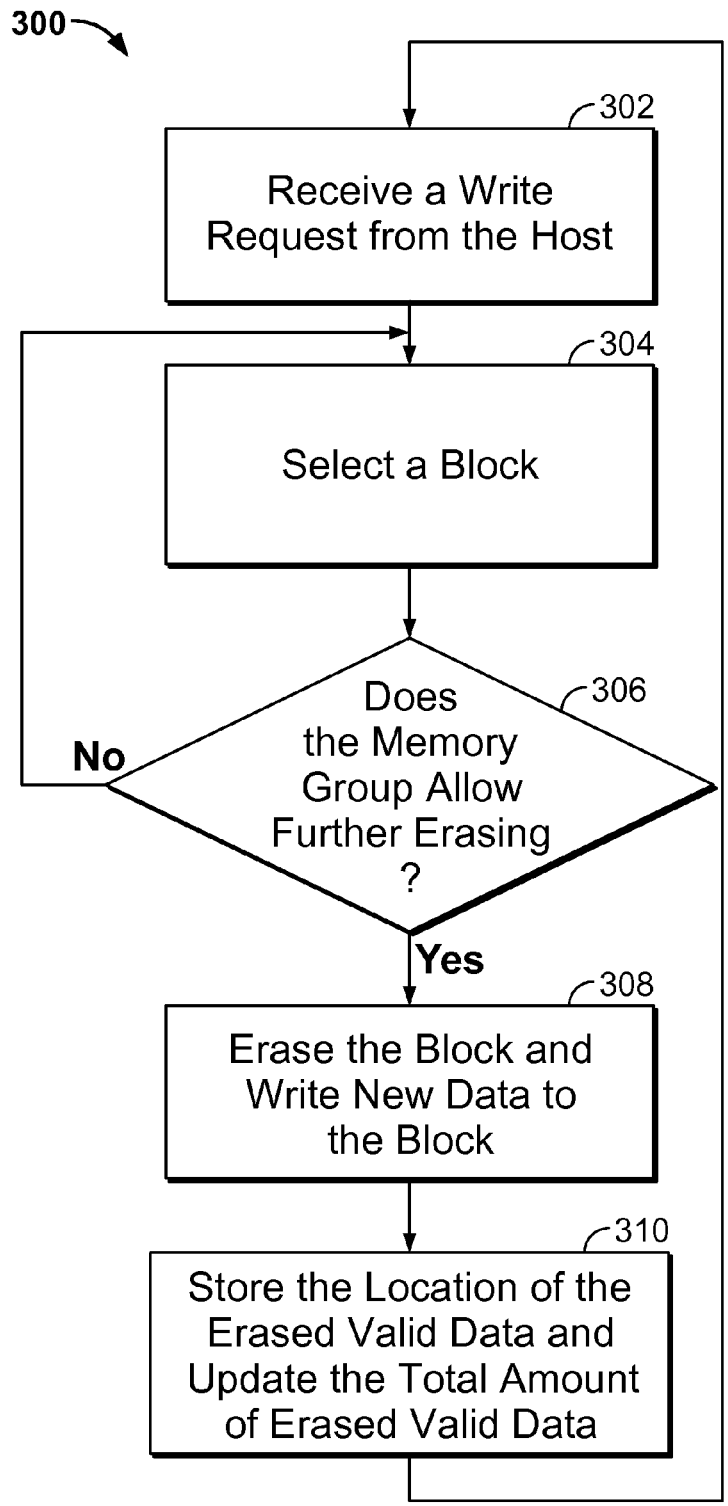
FIG. 3 is a flowchart illustrating an exemplary process for processing a write request from the host.
Figure 4:
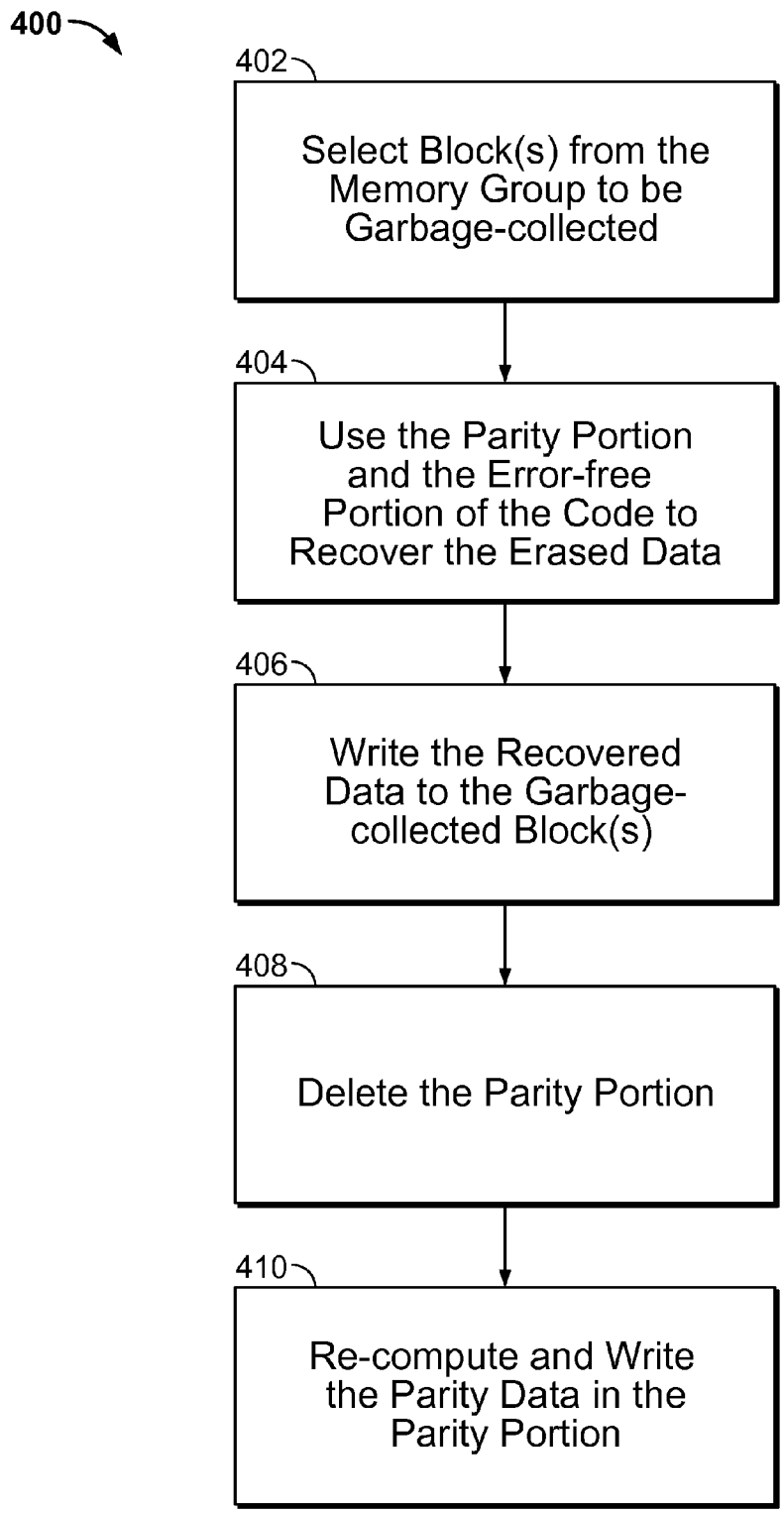
FIG. 4 is a flowchart illustrating an exemplary process for recovering the erased valid data in a memory group.

In some embodiments, the exemplary process 100 in FIG. 1 may include two separate processes: a process 300 for processing a write request from the host (see FIG. 3) and a process 400 for recovering the erased valid data (see FIG. 4).

FIG. 3 is a flowchart illustrating an exemplary process for processing a write request from the host. In some embodiments, process 300 is used to perform 108. At 302, a write request from the host is received. At 304, a block of memory (or multiple blocks) is selected from one of the memory groups. For example, in FIG. 2, a block in the second row is selected. In some embodiments, the block may be selected randomly. In some embodiments, the block may be selected in order. In some embodiments, the block with the least amount of valid data (a greedy reclaiming policy) is selected. At 306, if the memory group of the selected block allows for further erasing (i.e., if the recovery capability of the error-correcting code has not been reached), then the selected block of memory (including the valid data) is erased and rewritten with new data sent from the host at 308; otherwise, another block from another memory group is selected at 304 again until a block is found from a memory group which allows further erasing. At 310, the location of the erased valid data and the total amount of erased valid data are stored. In some embodiments, the stored location of the erased valid data may be used in process 400 (see FIG. 4) for recovering the erased valid data. In some embodiments, the stored total amount of erased valid data may be used at step 306 for determining whether the recovery capability of the error-correcting code has been reached.

FIG. 4 is a flowchart illustrating an exemplary process for recovering the erased valid data in a memory group. In some embodiments, process 400 is used to perform 110. At 402, one or more blocks of memory are selected for garbage-collection. In some embodiments, the block(s) with the least number of valid pages is (are) garbage-collected. In some embodiments, the block(s) are selected based on the number of valid pages and the erase count. At 404, the parity portion and the error-free portion of the code are used to recover the erased valid data. At 406, the recovered data are written to the garbage-collected block(s). At 408, the parity portion is deleted. At 410, the parity data is re-computed and written to the parity portion of the memory group.

In some embodiments, process 400 is run just prior to a read request for the erased valid data. In some embodiments, process 400 is run when the controller for the SSD is in an idle mode. In this case, process 400 may be run when the recovery capability of the error-correcting code is close to being reached but prior to a read request for the erased valid data. The advantage of this latter method is that the amount of delay in processing the read request for the erased valid data may be reduced or avoided, because the read request may be serviced immediately without waiting for the erased data to be recovered. However, the recovery capability of the error-correcting code may not be fully utilized.

In various embodiments, different kinds of error-correcting codes may be used to recover the erased valid data. The error-correcting codes that can be used include, but are not limited to, BCH codes, checksums, and parity check codes. Error-correcting codes are characterized by 3 parameters, denoted by the 3-tuple (n, k, t): n is the length of the code, k is the length of the data portion, and t is the number of errors that can be corrected by the error-correcting code. For example, (n, k, t) may be (12, 10, 5); in this case, for every ten blocks of data, there are two blocks of parity data. In some embodiments, for a given n-k, a code that maximizes parameter t may be selected. In some embodiments, a code that requires the least amount of bookkeeping (e.g., keeping track of the position and number of valid pages that have been over-written) may be selected, even though the code's parameter t may not be the greatest for a given n-k value. For some codes, a larger value for parameter t can be achieved if the location of the erased data is known. The tradeoff is that more bookkeeping may be needed. In general, the longer the code, the greater the number of blocks per memory group, which translates to more bookkeeping but a greater reduction in the write amplification value.

Figure 5:
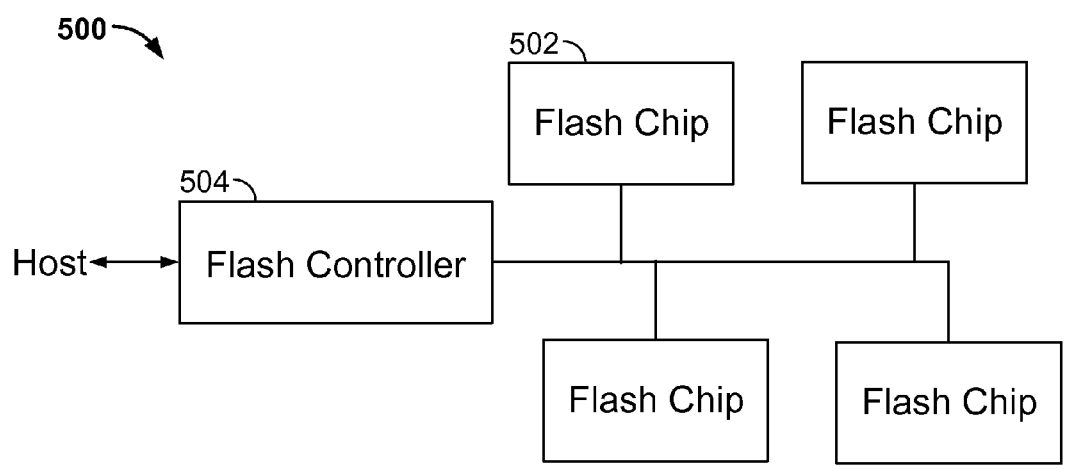
FIG. 5 is a block diagram illustrating an exemplary embodiment of a system for flash memory management.

FIG. 5 is a block diagram illustrating an exemplary embodiment of a system for flash memory management. In some embodiments, a plurality of flash chips 502 (e.g., NAND flash chips) may be grouped into channels, and multiple channels may be connected to a flash controller 504. The flash controller 504 is also connected to the host. The flash controller 504 may include one or more processors for running firmware or software for the processes disclosed in the present application, including garbage collection, wear-leveling, processing of read/write request from the host, recovering data using error-correction, and the like. In some embodiments, system 500 may further include other components, such as static random access memory (SRAM), synchronous dynamic random access memory (SDRAM) buffer, and a host interface chip.

The techniques disclosed in the present application reduce the amount of write amplification in an SSD by improving the distribution of invalid pages over the blocks. User writes and rewrites on an SSD are typically random and thus tend to be uniformly distributed. This in turn causes the invalid pages to be distributed all over the flash memory, portending the worst case scenario for write amplification. The techniques disclosed herein reduce the amount of write amplification by ensuring that invalid pages are concentrated on a few blocks. Using error correction codes, once a block is garbage collected, the valid pages in that block are not necessarily written elsewhere immediately; rather, valid pages may be collected until the code's recovery capability is reached. This leads to a more concentrated distribution of the invalid pages in a block, thereby reducing the amount of write amplification.

Simulation results have shown that for the same amount of over-provisioning, e.g., 25%, the coded system disclosed herein may lead to a 20-30% improvement in write amplification. In some embodiments, this improvement may be further increased by using longer error-correcting codes with more bookkeeping.

FIG. 6 is a histogram comparing the amount of write amplification for an uncoded system using the greedy reclaiming policy and the coded system disclosed herein. The over-provisioning for both cases is fixed at 25%. As shown in FIG. 6, the coded system has a greater number of smaller write amplification values with the same amount of over-provisioning compared to the uncoded system.

Besides reducing the amount of write amplification of an SSD, the coded system can also increase the speed of memory writes to the SSD. This is because when the host issues a write request, the new data may be written to the flash memory immediately without relocating any data to a temporary buffer and then rewriting them back to the memory. In addition, in some embodiments, the coded system may be combined with wear-leveling, thus extending the SSD drive lifetime even further.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of storing data from a host, comprising:
dividing a flash memory into a plurality of memory groups, the memory groups each comprising a plurality of flash memory blocks;
allocating a first portion of one of the plurality of memory groups for storing parity data of an error-correcting code for the memory group;
allocating a second portion of the memory group for storing data from the host;
using a controller to erase a flash memory block in the memory group prior to writing the data from the host, wherein the flash memory block contains valid data; and
recovering the erased valid data using the error-correcting code.

2. The method as recited in claim 1, wherein the recovering of the erased valid data using the error-correcting code is performed before a total amount of erased valid data in the memory group exceeds a maximum amount of data correctable by the error-correcting code.

3. The method as recited in claim 1, wherein the recovering of the erased valid data is performed before a read request for the erased valid data.

4. The method as recited in claim 1, wherein the recovering of the erased valid data is performed during an idle period of a controller for the flash memory.

5. The method as recited in claim 1, wherein the recovering of the erased valid data is based on the parity data.

6. The method as recited in claim 1, wherein the first portion of the memory group for storing parity data comprises a plurality of flash memory blocks.

7. The method as recited in claim 1, further comprising recomputing the parity data after the erased valid data are recovered.

8. The method as recited in claim 1, the error-correcting code spanning across the plurality of flash memory blocks in the memory group.

9. The method as recited in claim 1, further comprising updating a counter for the total amount of erased valid data in the memory group.

10. The method as recited in claim 1, further comprising storing the location of the erased valid data.

11. A system for storing data from a host, comprising:
    a processor configured to:
        divide a flash memory into a plurality of memory groups, the memory groups each comprising a plurality of flash memory blocks;
        allocate a first portion of one of the plurality of memory groups for storing parity data of an error-correcting code for the memory group;
        allocate a second portion of the memory group for storing data from the host;
        erase a flash memory block in the memory group prior to writing the data from the host, wherein the flash memory block contains valid data; and
        recover the erased valid data using the error-correcting code; and
    a memory coupled to the processor and configured to provide the processor with instructions.

12. The system as recited in claim 11, wherein the recovering of the erased valid data using the error-correcting code is performed before a total amount of erased valid data in the memory group exceeds a maximum amount of data correctable by the error-correcting code.

13. The system as recited in claim 11, wherein the recovering of the erased valid data is performed before a read request for the erased valid data.

14. The system as recited in claim 11, wherein the recovering of the erased valid data is performed during an idle period of a controller for the flash memory.

15. The system as recited in claim 11, wherein the recovering of the erased valid data is based on the parity data.

16. The system as recited in claim 11, the error-correcting code spanning across the plurality of flash memory blocks in the memory group.

17. A computer program product for storing data from a host, the computer program product being embodied in a non-transitory computer readable storage medium and comprising computer instructions for:
    dividing a flash memory into a plurality of memory groups, the memory groups each comprising a plurality of flash memory blocks;
    allocating a first portion of one of the plurality of memory groups for storing parity data of an error-correcting code for the memory group;
    allocating a second portion of the memory group for storing data from the host;
    erasing a flash memory block in the memory group prior to writing the data from the host, wherein the flash memory block contains valid data; and
    recovering the erased valid data using the error-correcting code.

18. The computer program product as recited in claim 17, wherein the recovering of the erased valid data using the error-correcting code is performed before a total amount of erased valid data in the memory group exceeds a maximum amount of data correctable by the error-correcting code.

19. The computer program product as recited in claim 17, wherein the recovering of the erased valid data is performed before a read request for the erased valid data.

20. The computer program product as recited in claim 17, wherein the recovering of the erased valid data is performed during an idle period of a controller for the flash memory.

21. The computer program product as recited in claim 17, wherein the recovering of the erased valid data is based on the parity data.

22. The computer program product as recited in claim 17, the error-correcting code spanning across the plurality of flash memory blocks in the memory group.

* * * * *